Jan. 4, 1944.   F. M. KOON   2,338,647
FISH SCALER
Filed July 20, 1942
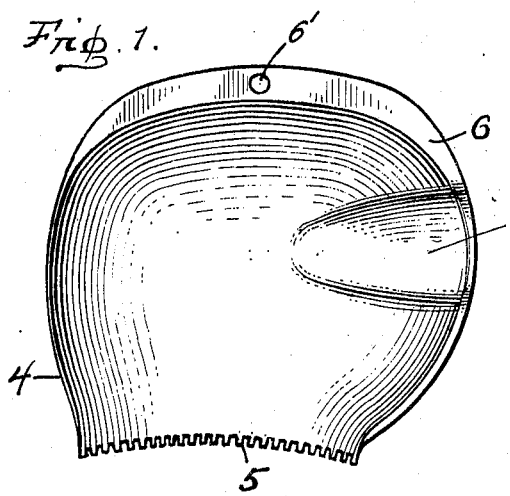
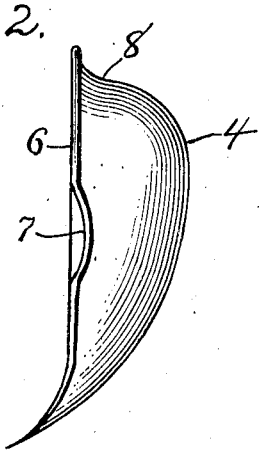
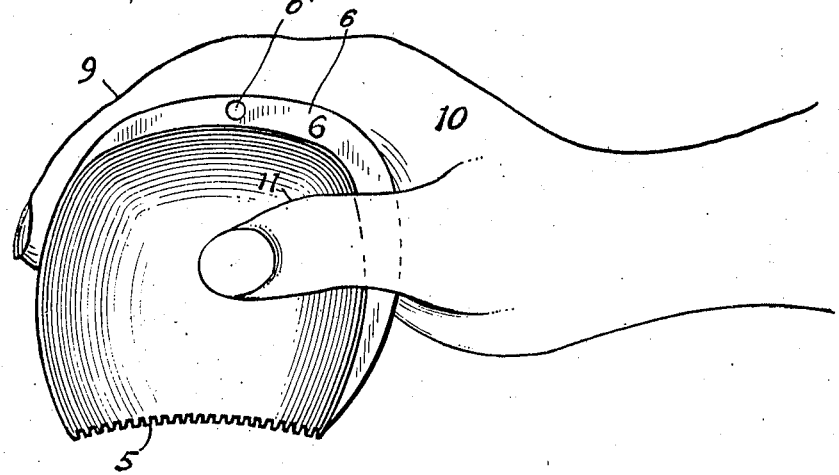
Francis Marion Koon INVENTOR
BY
A. G. Burns ATTORNEY Patented Jan. 4, 1944

2,338,647

UNITED STATES PATENT OFFICE 2,338,647

FISH SCALER

Francis Marion Koon, Fort Wayne, Ind.

Application July 20, 1942, Serial No. 451,521

3 Claims. (Cl. 17—7)

This invention relates to a fish scaler, and an object thereof is to afford a manually operated utensil of simple construction, preferably formed of a single piece of sheet metal and shaped to snugly fit in the grasp of the operator's hand, thus to facilitate efficiency and ease of operation especially during protracted use.

Another object of the invention is to provide a fish scaler that is conveniently manipulated which has a fish-body-fitting toothed edge and a portion that serves both as a handle and a scale deflector.

And a further object of the invention is to so shape the scaler that it is readily adapted to be nested with other like scalers, thus to facilitate packing for transport, storage and merchandising.

Other objects and advantages of the invention appear in the following description.

An illustrative embodiment of the invention is shown in the accompanying drawing, in which:

Fig. 1 is a front elevational view of a fish scaler in which the invention is incorporated;

Fig. 2 is a side elevational view projected from Fig. 1 and Fig. 3 is a perspective view of the scaler as it appears grasped by the hand of an operator.

The illustrative embodiment of the invention consists of a metallic shell 4 one marginal portion of which extends forwardly and is shaped to have an arcuate serrated cutting edge 5, the arc of the edge being concave to such an extent as to approximately conform to the convexity of a fish's body especially the side walls thereof. The front of the shell is cavernous and has an outwardly projecting marginal radial flange 6 that extends from one end of the cutting edge 5 around one side of the shell and over the top thereof along its marginal edge. The flange has made therein a perforation 6' for reception of any suitable support (not shown).

Preferably, the flange 6 and that side portion of the shell adjacent thereto has made in the forward face thereof a thumb-fitting depression 7, and the upper back portion of the flange and the adjacent portion of the shell, along the juncture thereof, is shaped to form a rounded concave seat 8 for the forefinger 9 of the operator, so that when the scaler is grasped by the hand 10 of the operator it is snuggled between the thumb 11 that rests in the depression 7 and the side of the forefinger that bears against said forefinger seat. In this manner the scaler is held comfortably while gripped firmly between the thumb and forefinger as it is applied in removing scales from the fish.

In use, the scaler is grasped as shown in Fig. 3 and the inwardly arched serrated cutting edge thereof is applied to the body of the fish by stroking it against the free edges of the scales, whereupon, the scales become detached and deflected by the cavernous shell in a common direction forwardly and thus general scatterment of the scales in all directions is averted. These are characteristics of the invention which distinguish it from ordinary scalers that are without either a scale deflecting means or a concave serrated cutting edge.

Shaping of the scaler so as to closely fit the contacting parts of the operator's hand is particularly advantageous because of the consequent deferment of fatigue especially when the magnitude of the catch to be dressed is considerable.

Variations from the particular construction above disclosed may be resorted to by the exercise of skill in the art, without departure from the spirit or scope of the invention, and the following claims are intended to be inclusive of such variations.

What I claim is:

1. A fish scaler consisting of cavernous metallic shell one edge portion of which presents a concave arcuate serrated cutting edge, said shell having an outwardly projecting radial flange extending from one end of said cutting edge around one side of the shell and over the top thereof along its marginal edge, said flange and that side portion of the shell adjacent thereto having in the front face thereof a thumb-fitting depression, and the upper back portion of said flange and adjacent portion of the shell being shaped to provide a forefinger seat.

2. A fish scaler consisting of a cavernous metallic shell shaped to have a scale deflecting face, the lower marginal portion of which extends forwardly and has an arcuate serrated cutting edge that is curved inwardly between its ends so as to conform substantially to the convexity of the body of a fish, the upper portion of said shell having an outwardly extending radial flange, said flange and shell along the juncture thereof being shaped to provide a rounded concave forefinger seat, the arrangement being such that the side of the operator's forefinger bears against the seat when the shell is grasped between the forefinger and thumb.

3. A fish scale remover consisting of a shell the front of which presents a concave scale-deflecting face, one marginal portion of which is shaped to present an arcuate fish body form-fitting cutting edge, and an opposite marginal portion of said shell having an outwardly extending radial flange and a rounded concave forefinger form-fitting seat extending along the juncture of said flange and adjacent portion of the shell that bears against the side of the forefinger when the shell is grasped between the thumb and forefinger of the operator.

FRANCIS MARION KOON.